Patented May 16, 1939

2,158,064

UNITED STATES PATENT OFFICE 2,158,064

POLYAMIDES AND THEIR PRODUCTION

Wallace Hume Carothers, Wilmington, Del., assignor to E. I. du Pont de Nemours & Company, Wilmington, Del., a corporation of Delaware No Drawing. Application July 1, 1936,
Serial No. 88,492

24 Claims. (Cl. 260—78)

This invention relates to polymeric materials, and more particularly to new polyamides.

This case is a continuation in part of my application Serial Number 181 filed January 2, 1935.

In my former application identified above I have disclosed polyamides derived from diamines and dibasic acids. The polyamides thus prepared are high melting, relatively insoluble products which in many instances are, or can be converted into, highly polymeric linear condensation products which may be drawn into useful fibers.

I have now discovered that if one or both of the reactants, the diamine or dibasic acid, contains a hetero atom of the oxygen family that the resulting polyamide containing the hetero atom or atoms in the chain, although less suitable for the production of fibers, are soluble in a large number of common organic solvents and are more adapted to the preparation of coating, impregnating, sizing, adhesive, and molding compositions than those prepared from polyamides which do not contain a hetero atom. By "hetero atom" I mean an atom other than carbon which appears in the chain of atoms separating the reactive groups in the polyamide-forming reactants, i. e., the amino groups in the case of a diamine and the carboxyl groups in the case of a dibasic acid. Thus, there is mentioned as a polyamide-forming reactant in my above identified application 2,2'-diaminodiethyl ether

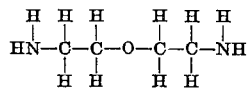

which is a diamine containing the hetero atom oxygen. This diamine reacts with dibasic acids, e. g. glutaric acid

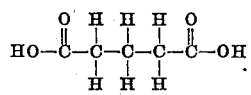

also mentioned in my above identified application, through elimination of water and the joining of the diamine radical of radical length 7 with the dibasic acid radical of radical length 5 with the formation of a polyamide of unit length 12, i. e. having recurring structural units of chain length 12

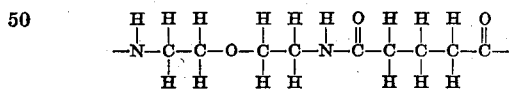

As indicated above, the hetero atoms may also be in the dibasic acid radical or in both the diamine and dibasic acid radicals. The hetero atom contained in the polyamide and derived from diamines and/or dibasic acids containing the hetero atom between the reactive groups, i. e., the amino or imino and the carboxyl groups, may be oxygen, sulfur, selenium, and tellurium.

This invention has as an object the preparation of new and useful polymeric products. A further object is the production of soluble resinous polyamides which are useful in the coating and other arts. Other objects will appear hereinafter.

These objects are accomplished by heating to reaction temperature in the presence or absence of a solvent or diluent, a diamine and a dicarboxylic acid or an amide-forming derivative of a dibasic carboxylic acid, at least one of said reactants containing a hetero atom of the oxygen family, until a polymeric product is obtained.

In the preferred practice of my invention substantially chemically equivalent amounts of a diamine and a dicarboxylic acid or amide-forming derivative of a dibasic carboxylic acid (the ester, half ester, acid chloride, anhydride, or amide) are heated in the absence of a solvent (fusion method) or in the presence of a solvent at a temperature which is generally in the range of 100° to 300° C., and preferably at 200°–275° C., until a polymer of the desired properties is formed. The reaction may also be carried out in the presence of a diluent which is a non-solvent for the polymer. The reaction is of the condensation-polymerization type and involves the formation of the by-product water, alcohol, phenol, hydrogen chloride, or ammonia, depending upon the derivative of the dibasic acid used.

The first reaction which occurs when a diamine and a dicarboxylic acid are mixed and brought into sufficiently intimate contact is the formation of the diamine-dicarboxylic acid salt. It is often desirable to separate and purify the salt prior to its conversion into the polyamide. The salts are generally crystalline and are readily purified by recrystallization from a suitable solvent, such as water, alcohol, or alcohol-water mixtures, and have definite compositions. The preparation of the salts affords an automatic means for adjusting the amine and acid reactants to substantial equivalency and it avoids the difficulties attendant upon the preservation of the isolated amine in the state of purity. The formation and purification of the salts tends to eliminate impurities present in the original diamine and dibasic acid.

The products of this invention then are prepared by reaction of a diamine with a dicarboxylic acid or amide-forming derivative of a dibasic carboxylic acid, in which at least one of the reactants contains a hetero atom of the oxygen family, i. e., an atom of the oxygen family is present in the chain of atoms which separates the reactive groups (amino or carboxyl) in the reactants. The process described herein may be carried out with primary or secondary diamines; in other words, diamines in which the amino nitrogens each bear at least one hydrogen atom. Of this group the di-primary diamines react most readily and are preferred. A large number of possible combinations of reactants are possible in the preparation of the products of this invention. For example, it is possible to make polyamides in which the diamine represented contains a hetero atom, products in which the dibasic acid represented contains a hetero atom, and products in which both the diamine and dibasic acid represented contain hetero atoms. Amino acids with or without hetero atoms can be used in conjunction with these reactants. It is also possible to prepare products in which only a portion of the diamine or dibasic acid represented contains a hetero atom. Upon hydrolysis with strong mineral acids these products yield the dibasic acid and diamine (as mineral acid salt) from which they were derived. In other words, they yield a monomeric product of formula XRAR′X in which X represents an amino or carboxyl group, R and R′ represent divalent hydrocarbon radicals, and A represents the hetero atom of the oxygen family.

In making my new polyamides the heating may be carried out in an open or closed reactor under ordinary pressure or under reduced or increased pressure. Generally, it is desirable to effect the reaction under conditions which permit the escape of water or other by-product of the reaction. The reaction is preferably carried out in the absence of air; sometimes the addition of antioxidants is desirable. While it is usually unnecessary to add a catalyst, inorganic materials of alkaline reaction such as oxides and carbonates, and acidic materials such as halogen salts of polyvalent elements, e. g., aluminum and tin, are often helpful.

The following examples, in which parts are by weight, are illustrative of the preparation and application of the products of this invention:

EXAMPLE I

*Polyamide from diphenylolpropanediacetic acid and decamethylenediamine*

An ethanol solution of 17.2 parts of decamethylenediamine was added to an ethanol solution of 34.4 parts of diphenylolpropane diacetic acid, $(CH_3)_2C(C_6H_4OCH_2COOH)_2$; prepared by condensing the sodium salt of diphenylolpropane with chloroacetic acid in the presence of an excess of alkali (m. p. 173–4° C.; neutral equivalent calcd., 172; neutral equivalent found, 171). After standing for about fifteen minutes the crystalline diaminedibasic acid salt thus formed was separated and washed with a small quantity of alcohol. The salt was then redissolved by heating with 50% ethanol and a sufficient amount of diphenylolpropanediacetic acid was added to make the solution neutral to litmus. The salt, which crystallized out upon cooling, was air-dried. It was then heated with an equal weight of phenol for two hours at 220–225° C. During the last half hour the pressure was reduced to 2 mm. to remove the phenol. The polyamide thus formed contained the hetero atom oxygen as illustrated by the following formula for the recurring unit:

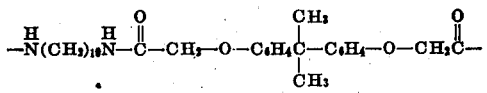

It was clear, amber-colored, hard, and very tough resin which softened at about 63° C. It was soluble in the ethyl ether of ethylene glycol, in dioxan, and in certain mixtures of ethanol and benzene. It was compatible with drying oil modified polyhydric alcohol-polybasic acid resins and with nitrocellulose; it could be used in coating compositions, either alone or in conjunction with these materials as well as other film-forming materials. These compositions showed good adhesion to metals, glass, and "Cellophane". In addition they had good resistance to water, alkali, and acids. Detached films (made from solutions in dioxan or other solvents) were strong and tough. The polyamide was also well adapted to molding; it could be molded at 100–125° C. under 1500 lb./sq. in. pressure into hard, tough, amber-colored products.

EXAMPLE II

*Polyamide from diphenylpropanediacetic acid and decamethylenediamine*

Thirty-six parts of decamethylenediamine dissolved in 50 parts of ethanol was added to a solution of 69 parts of diphenylolpropanediacetic acid in 200 parts of ethanol. The solution was allowed to stand overnight to complete crystallization of the diamine-dibasic acid salt. The yield of salt was 102 parts. Fifty-one parts of the salt and 200 parts of white medicinal oil were heated with stirring for two hours at 225° C. Nitrogen was passed over the surface to displace the air and to prevent discoloration during heating. The product was similar to that produced in Example I, but was very light in color and opalescent.

EXAMPLE III

*Polyamide from ethylenediamine and diphenylolpropanediacetic acid*

A mixture of 65 parts of diphenylolpropanediacetic acid and 12.5 parts of ethylene diamine was heated in an atmosphere of nitrogen for two hours at 220–225° C. with constant stirring. The resinous polyamide thus formed was pale amber in color and quite hard. It was soluble in dioxan, in the ethyl ether of ethylene glycol, and in certain ethanol-benzene mixtures. It softened at about 85° C. Unlike Examples I and II the dibasic acid and diamine in this example are not used in equimolecular proportions. The polymer of this example cannot be formed into useful oriented fibers.

EXAMPLE IV

*Superpolyamide from hexamethylenediamine and a mixture of adipic and diphenylolpropanediacetic acids*

A solution containing 14.5 parts of diphenylolpropanediacetic acid and 24.6 parts of adipic acid in 150 parts of ethanol was prepared. To this solution there was added a solution of 24.5 parts of pure hexamethylenediamine in 200 parts of ethanol. The resultant salt (63 parts) was heated with an equal weight of phenol under conditions which permitted the water and phenol to distill slowly from the reaction mixture. The heating was carried out as follows: 0.5 hour at 200–210° C., 1.0 hour at 220–225° C., and 0.5 hour under 3 mm. absolute pressure, while increasing the temperature slowly to 295° C. to remove all the phenol. The polymer thus formed was very tough and hard and melted at 225° C. It was crystalline rather than resinous. It will be noted that this product is actually an interpolymer, derived from a diamine and a mixture of dicarboxylic acids one of which (diphenylolpropanediacetic) contains the hetero atom oxygen. The molar ratio in which the adipic acid and diphenylolpropanediacetic acid were used was 4:1; in other words, the product can be looked upon as polyhexamethylene adipamide in which 20% of the adipic acid represented has been replaced by diphenylolpropanediacetic acid. It could be spun into filaments capable of being cold-drawn into oriented fibers, i. e., it was a superpolyamide of the type described in above mentioned application. Its intrinsic viscosity was 0.71.

EXAMPLE V

*Polyamide from salicylacetic acid and decamethylenediamine*

A mixture of 19.6 parts of salicylacetic acid

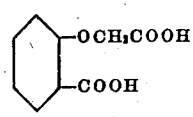

was heated with 18.1 parts of decamethylene diamine for 1.5 hours at 220–225° C. The product was a light amber in color and was rather soft and tacky at room temperature.

EXAMPLE VI

*Polyamide from dithiodiglycollic acid and decamethylenediamine*

A mixture of 8.5 parts of dithiodiglycollic acid, $HOOCCH_2S-S-CH_2COOH$, and 8.1 parts of decamethylenediamine dissolved in 16 parts of phenol was heated for 1.5 hours at 200–210° C. During the last half of the heating the phenol was removed under reduced pressure. The resultant resinous polyamide, containing the hetero atom sulfur, was soluble in ethanol and in the ethyl ether of ethylene glycol. It softened at 36° C.

EXAMPLE VII

*Polyamide from dicarboxydibenzyldisulfide and decamethylenediamine*

One hundred sixty-seven parts of dicarboxydibenzyldisulfide, $(HOOC-C_6H_4-CH_2-)_2S_2$, was heated with 90 parts of decamethylenediamine and 250 parts of phenol at 200–210° C. for 1.5 hours. During the last half hour the phenol was removed under reduced pressure. The product was a hard, reddish-brown resin softening at about 39° C.

EXAMPLE VIII

*Polyamide from diglycollic acid and pentamethylenediamine*

A solution of 9.4 parts of pentamethylenediamine and 12.3 parts of diglycollic acid in 20 parts of m-cresol was heated in an open reactor in an atmosphere of nitrogen for two hours at 205° C. The heating was then continued for 2.5 hours at 220° C. under 2 mm. pressure with the removal of the m-cresol. The product thus formed was a translucid, amber-colored resin which started to soften at 60° C. and melted completely at 130° C. It had an intrinsic viscosity of 0.43. It could be spun from melt into continuous brittle filaments.

As will be seen from the examples, the polyamides of this invention can be prepared in the presence or absence of a solvent or diluent. When easily volatile reactants are used, e. g., ethylenediamine, it is desirable to carry out at least the initial stage of the reaction in a closed vessel or under reflux to prevent loss of reactant. The products of this invention are conveniently prepared in an open reactor equipped with a reflux condenser which permits the water or other by-product of the reaction to escape but not the reactants or solvent. During the latter stages of the reaction it is often desirable to decrease the pressure in order to complete the reaction and, if desired, to distill off the solvent. However, the product can be removed from the solvent by precipitation methods. Especially useful solvents for the preparation of the polyamides of this invention are monohydric phenols such as phenol, cresols, xylenols, hydroxydiphenyls, and the like.

As examples of acids containing hetero atoms other than the acids mentioned in the examples, there may be mentioned diphenylolcyclohexanediacetic acid, di-beta-naphtholdiacetic acid, and resorcinoldiacetic acid. Acids of this group, including diphenylolpropanediacetic acid mentioned in Examples I to III, are easily prepared and yield valuable resins when reacted with diamines. For these reasons they are the preferred dibasic acids for use in this invention. They may be represented by the general formula $HOOCCH_2OROCH_2COOH$ in which R represents a divalent organic radical. Of this group, diphenylolpropanediacetic acid is preferred since it yields particularly valuable resins with most diamines. In addition to the products described in the examples, resins have been prepared by reacting diphenylolpropanediacetic acid with the following diamines, the softening points of the products being given in parenthesis: N-phenyl ethylenediamine (76° C.), N-N'-diphenyl ethylenediamine (50° C.), hexamethylenediamine (93° C.), 1,4-diaminocyclohexane (160° C.), and 4,4'-diaminodiphenylmethane (130° C.). The first and second of the aforementioned polymers are derived from secondary diamines and are not fiber-forming. The sulfur analogs of the above acids may also be used. Acids of type

may also be used. As already indicated, dibasic acids containing hetero atoms may be reacted with any primary or secondary diamine. Additional examples of diamines which may be used are tetramethylenediamine, pentamethylenediamine, heptamethylenediamine, octamethylenediamine, nonamethylenediamine, and p-xylylenedimine.

In the polyamides given in the foregoing examples, the hetero atom is present in the dibasic acid radical represented. As previously observed, the hetero atom may also be in the diamine radical. Thus, polyamides containing hetero atoms of the oxygen family can be prepared by reacting diamines of such types as

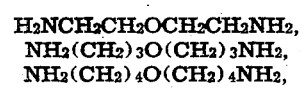

and $H_2NCH_2CH_2SCH_2CH_2NH_2$ with dicarboxylic acids or amide-forming derivatives of dibasic carboxylic acids, such as dibutyl carbonate, diethyl oxalate, malonic acid, glutaric acid, adipic acid, pimelic acid, suberic acid, azelaic acid, sebacic acid, and p-phenylene diacetic acid, as well as dicarboxylic acids containing hetero atoms of the oxygen family. In order to obtain the most useful polyamides of this invention it is in general necessary that the sum of the radical lengths of the diamine and dibasic acid used be at least seven, otherwise cyclic low molecular weight substances are the chief products formed.

Example IV illustrates the preparation of an interpolyamide using one diamine and two dibasic acids. It is evident that many combinations of reactants are possible in the preparation of interpolymers. Polymerizable monoaminomonocarboxylic acids may be used for a portion of the diamine-dibasic acid mixture. This invention comprehends all such products in which one reactant contains a hetero atom of the oxygen family in the chain of atoms separating the reactive groups. It is also within the scope of this invention to mix preformed polyamides, at least one of which contains a hetero atom of the oxygen family. Thus a mixture consisting of 12 parts of the hexamethylenediamine-adipic acid superpolymer (m. p. 248° C.) and 3 parts of diphenylolpropanediacetic acid - decamethylenediamine resin (m. p. 62° C.) was prepared by dissolving the two polyamides in 15 parts of hot phenol and precipitating them therefrom by pouring the solution into a large volume of ethyl acetate-ethanol mixture. The product thus formed retained most of the properties of the superpolyamide; on crystallization from ethylene chlorohydrin, it melted at 245° C. and yielded, on spinning from melt, filaments capable of being drawn into oriented fibers. Mixing of polyamides of this invention is often a useful method for blending their properties.

As will be seen from the foregoing description, the present invention is capable of yielding products of widely different properties depending upon the reactants selected in their preparation. When the products are used in the preparation of fibers it is generally desirable to incorporate therewith a fiber-forming superpolymer of the kind described in my previously mentioned application. The products of the invention described herein are for the most part resins whose softening point and solubility are dependent upon the reactants used in their preparation. In general, the products are soluble in such solvents as alcohols, phenols, organic acids, ethylene chlorohydrin, dioxan, ethers of ethylene glycol, and mixtures of alcohols with aromatic hydrocarbons. For the most part they have good compatibility characteristics and can be admixed with drying oils, resins, cellulose derivatives, etc. These properties make the products useful in the coating, plastic, sizing, adhesive, impregnating, and textile arts. Certain of the products can be used directly as such in the preparation of lacquers, enamels, etc.

As many apparently widely different embodiments of this invention may be made without departing from the spirit and scope thereof, it is to be understood that I do not limit myself to the specific embodiments thereof except as defined in the appended claims.

I claim:

1. A process for making polyamides which comprises reacting ingredients consisting substantially solely of amide-forming reactants one of which is selected from the class consisting of dicarboxylic acids and monomeric amide-forming derivatives of dibasic carboxylic acids, and the other of which is a diamine whose amino nitrogens each carries at least one hydrogen atom, at least one of said ingredients containing an atom of the oxygen family in the chain of atoms separating the reactive groups.

2. A process for making polyamides which comprises heating at approximately 100° to 300° C. ingredients consisting substantially solely of a diamine in which the amino nitrogens each carries at least one hydrogen atom, and a substance of the class consisting of dicarboxylic acids and monomeric amide-forming derivatives thereof having a hetero atom of the oxygen family in the chain of atoms separating the acid groups.

3. The process set forth in claim 2 in which said hetero atom is one of the class consisting of oxygen and sulfur.

4. A process for making polyamides which comprises heating at approximately 100° to 300° C. ingredients consisting substantially solely of amide-forming reactants one of which is selected from the class consisting of dicarboxylic acids and monomeric amide-forming derivatives of dibasic carboxylic acids and the other of which is a diamine in which the amino nitrogens each carries at least one hydrogen atom, said diamine having a hetero atom of the oxygen family in the chain of atoms separating the amino nitrogen atoms.

5. The process set forth in claim 4 in which the hetero atom is one of the class consisting of oxygen and sulfur.

6. A process for making polyamides which comprises heating at approximately 100° to 300° C. ingredients consisting substantially solely of polyamide-forming reactants one of which is a diamine in which the amino nitrogens each carries at least one hydrogen atom, and another of which is selected from the class consisting of dibasic acids of the formula

HOOCCH₂OROCH₂COOH in which P is a divalent hydrocarbon radical, and amide-forming derivatives thereof.

7. The process set forth in claim 6 in which said dibasic acid is diphenylolpropanediacetic acid.

8. The process set forth in claim 1 in which the radical lengths of the diamine and dibasic acid are such that their sum is at least 7.

9. A linear polyamide consisting essentially of recurring structural units containing a hetero atom of the oxygen family in the chain of atoms constituting said units, said polyamide being obtainable from ingredients consisting substantially solely of monomeric amide-forming reactants.

10. A polyamide containing a hetero atom which comprises the reaction product of ingredients consisting substantially solely of amide-forming reactants one of which is selected from the class consisting of dicarboxylic acids and monomeric amide-forming derivatives of dibasic carboxylic acids, and the other of which is a diamine whose amino nitrogens each carries at least one hydrogen atom, at least one of said ingredients containing a hetero atom of the oxygen family in the chain of atoms separating the reactive groups.

11. A polyamide containing a hetero atom which comprises the reaction product of ingredients consisting substantially solely of a diamine in which the amino nitrogens each carries at least one hydrogen atom, and a substance of the class consisting of dicarboxylic acids and monomeric amide-forming derivatives thereof having a hetero atom of the oxygen family in the chain of atoms separating the acid groups.

12. A resinous polyamide soluble in organic solvents, said polyamide being the reaction product of ingredients consisting substantially solely of a diamine in which the amino nitrogens each carries at least one hydrogen atom and a substance of the class consisting of dicarboxylic acids and their monomeric amide-forming derivatives having a hetero atom of the oxygen family in the chain of atoms separating the carbonyl groups.

13. The polyamide defined in claim 12 in which the hetero atom is selected from the class consisting of oxygen and sulfur.

14. A resinous polyamide soluble in organic solvents, said polyamide being the reaction product of ingredients consisting substantially solely of polyamide-forming reactants one of which is selected from the class consisting of dicarboxylic acids and amide-forming derivatives of dibasic carboxylic acids, and another of which is a diamine in which the amino nitrogens each carries at least one hydrogen atom, said diamine having a hetero atom of the oxygen family in the chain of atoms separating the amino nitrogen atoms.

15. The polyamide defined in claim 14 in which the hetero atom is selected from the class consisting of oxygen and sulfur.

16. A resinous polyamide soluble in organic solvents, said polyamide being the reaction product of ingredients consisting substantially solely of polyamide-forming reactants one of which is a diamine in which the amino nitrogens each carries at least one hydrogen atom, and another of which is a reactant of the class consisting of a dicarboxylic acid of the formula $HOOCCH_2OROCH_2COOH$, in which R is a divalent hydrocarbon radical, and amide-forming derivatives thereof.

17. The polyamide defined in claim 16 in which said dicarboxylic acid is diphenylolpropanediacetic acid.

18. The product defined in claim 10 in which the recurring structural unit of the polyamide has a chain length of at least 7.

19. The product defined in claim 11 in which the recurring structural unit of the polyamide has a chain length of at least 7.

20. The product defined in claim 12 in which the recurring structural unit of the polyamide has a chain length of at least 7 and in which the hetero atom is selected from the class consisting of oxygen and sulfur.

21. The product defined in claim 14 in which the recurring structural unit of the polyamide has a chain length of at least 7.

22. A process for making polyamides which comprises heating reacting ingredients consisting substantially solely of a salt derived from a dicarboxylic acid and a diamine whose amino nitrogens each carries at least one hydrogen atom, at least one component of said salt containing an atom of the oxygen family in the chain of atoms separating the amide-forming groups thereof.

23. A process for making polyamides which comprises heating a salt derived from reacting ingredients consisting substantially solely of a diprimary diamine and a dicarboxylic acid of formula $HOOCCH_2OROCH_2COOH$, in which R is a divalent hydrocarbon radical.

24. A polyamide which upon hydrolysis with strong mineral acids yields substantially solely amide-forming compounds comprising a dibasic carboxylic acid and a diamine, at least one of said compounds having a hetero atom of the oxygen family in the chain separating the amide-forming groups.

WALLACE HUME CAROTHERS.